United States Patent [19]

Roy

[11] Patent Number: 4,740,270
[45] Date of Patent: Apr. 26, 1988

[54] VACUUM PYROLYSIS OF SCRAP TIRES

[75] Inventor: Christian Roy, Sherbrooke, Canada

[73] Assignee: Universite Laval, Cite Universitaire, Canada

[21] Appl. No.: 876,071

[22] Filed: Jun. 19, 1986

[51] Int. Cl.⁴ .............. C10B 53/00; C10B 57/00
[52] U.S. Cl. ................................. 201/35; 201/25; 201/30; 585/241
[58] Field of Search .......... 201/8, 25, 30, 35, 44, 201/10, 2.5, 45, 34, 32, 33; 585/240, 241; 48/209

[56] References Cited

U.S. PATENT DOCUMENTS

| | | | |
|---|---|---|---|
| 3,823,223 | 7/1974 | Liska et al. | 585/241 |
| 4,052,265 | 10/1977 | Kemp | 201/35 |
| 4,098,649 | 7/1978 | Redker | 201/25 |
| 4,118,282 | 10/1978 | Wallace | 201/30 |
| 4,150,548 | 4/1979 | Kemp et al. | 201/30 |
| 4,235,676 | 11/1980 | Chambers | 202/118 |
| 4,250,158 | 2/1981 | Solbakken et al. | 585/241 |

FOREIGN PATENT DOCUMENTS 118455  5/1944 Australia ............................ 201/30

Primary Examiner—Barry S. Richman
Assistant Examiner—Joye L. Woodard
Attorney, Agent, or Firm—Schwartz, Jeffery, Schwaab, Mack, Blumenthal & Evans

[57] ABSTRACT

A process for the treatment of used rubber tires by vacuum pyrolysis in a reactor to produce liquid and gaseous hydrocarbons and a solid carbonaceous material is disclosed. According to the invention, the pyrolysis of the tires is carried out at a temperature in the range of about 360° C. to about 415° C., under a subatmospheric pressure of less than about 35 mm Hg and such that gases and vapors produced in the reactor have a residence time of the order of a few seconds. The process according to the invention enables one to increase the yield of the liquid hydrocarbons and lower the yields of the gaseous hydrocarbons and solid carbonaceous material, and to thereby produce hydrocarbon oils in substantially maximum yield. These hydrocarbon oils have a high calorific value and are thus suitable for use as heating fuel.

15 Claims, 2 Drawing Sheets

4,740,270

VACUUM PYROLYSIS OF SCRAP TIRES

BACKGROUND OF THE INVENTION

The present invention relates to a process for the treatment of used rubber tires by vacuum pyrolysis to produce liquid and gaseous hydrocarbons and a solid carbonaceous material.

The accumulation of large quantities of scrap tires has become a major environmental problem. Because of their resistance to biodegradation, used automobile tires provide a favourable environment for vermin, rodents and fire. Environmental regulations, on the other hand, prohibit the disposal of such waste materials by burning outdoors or by burial underground.

One possible solution to the above problem is to convert the tires into fuels and other useful hydrocarbon products, for instance by thermal decomposition. In order to avoid side reactions and cross-reactions among product species when heating the tires under atmospheric or superatmospheric pressure, which results in a very inefficient conversion process, U.S. Pat. No. 4,235,676 has proposed to conduct the pyrolysis of rubber tires under sub-atmospheric pressure. According to this patent, the vacuum pyrolysis of tires is effected by moving a mass of shredded tires through an elongated tubular member maintained at a temperature between about 400° C. and 800° C., in the absence of air and/or oxygen, with the material being turned or stirred as it passes through the tubular member, and withdrawing the gases and vapors produced by means of a vacuum of from about 4 inches to about 6 inches of mercury (i.e. an absolute pressure of from about 608 mm Hg to about 658 mm Hg). The process conditions, however, are such as to promote the formation of gaseous hydrocarbons to the detriment of the more highly desirable hydrocarbon oils.

SUMMARY OF THE INVENTION

It is therefore an object of the present invention to carry out the pyrolysis of used rubber tires under conditions to promote the formation of liquid hydrocarbons and to thereby yield higher amounts of hydrocarbon oils.

In accordance with the invention, there is thus provided a process for the treatment of used rubber tires by vacuum pyrolysis in a reactor to produce liquid and gaseous hydrocarbons and a solid carbonaceous material, wherein the pyrolysis of the tires is carried out at a temperature in the range of about 360° C. to about 415° C., under a sub-atmospheric pressure of less than about 35 mm Hg and such that gases and vapors produced in the reactor have a residence time of the order of a few seconds, whereby to increase the yield of the liquid hydrocarbons and lower the yields of the gaseous hydrocarbons and solid carbonaceous material.

It has been unexpectedly found, according to the invention, that by selecting a pyrolysis temperature of about 360° C. to about 415° C., preferably of about 380° C. to about 400° C., a sub-atmospheric pressure of less than about 35 mm Hg, preferably of less than about 30 mm Hg, and a residence time of the gases and vapors in the reactor of a few seconds, preferably 1-3 sec., and conducting the process with such selected parameters, the yield of the highly desirable liquid hydrocarbons is significantly increased while the yields of the less desirable gaseous hydrocarbons and solid carbonaceous material are lowered, thereby enabling hydrocarbon oils to be obtained in substantially maximum yield. Indeed, it has been observed that if the tires are treated at a temperature above 415° C., there is a gasification of the residual solid carbonaceous material, producing more gaseous hydrocarbons without formation of any further liquid hydrocarbons. On the other hand, operating under a sub-atmospheric pressure greater than 35 mm Hg has been found to promote the formation of gaseous hydrocarbons to the detriment of the liquid hydrocarbons; a too long residence time of the gases and vapors in the reactor, i.e. exceeding a few seconds, also has the same detrimental effect.

The used rubber tires, prior to undergoing pyrolysis, are preferably shredded into cuttings. Such tire cuttings may have a mesh size of about 5-15 mm, for example.

According to a preferred embodiment of the invention, the reactor used for carrying the pyrolysis is a multi-tray reactor having a plurality of spaced-apart heated trays arranged above one another and each adapted to receive a bed of the tire cuttings for subjecting same to the pyrolysis. The trays are heated at temperatures to provide a vertical temperature gradient between uppermost and lowermost trays with the lowermost tray being heated at a temperature higher than the uppermost tray. For example, the uppermost and lowermost trays may be heated at about 250° C. and about 500° C., respectively; it should be understood, however, that the bed of tire cuttings even if heated by means of tray maintained at a temperature of about 500° C. is not allowed to reach a temperature exceeding about 415° C. and this may be achieved by controlling the residence time of the tire cuttings on such a tray.

Such a multi-tray reactor is advantageously provided with a plurality of discharge outlets each associated with a respective tray for discharging gaseous hydrocarbons and condensable hydrocarbon vapors generated in the reactor. These gaseous hydrocarbons and condensable hydrocarbon vapors are withdrawn from the reactor through the discharge outlets and passed through heat exchanger means for condensing the condensable hydrocarbon vapors to thereby obtain the liquid hydrocarbons. To this end, the discharge outlets are connected via the heat exchanger means to vacuum means for maintaining the sub-atmospheric pressure in the reactor and causing the gaseous hydrocarbons and condensable hydrocarbon vapors to flow out of the reactor through the discharge outlets.

Preferably, the heat exchanger means include primary and secondary heat exchanger means, the primary heat exchanger means comprising a plurality of heat exchanger elements each connected to a respective discharge outlet. The heat exchanger elements are maintained at temperatures to provide a vertical temperature gradient between uppermost and lowermost heat exchanger elements with the lowermost heat exchanger element being maintained at a temperature higher than the uppermost heat exchanger element. For example, the uppermost and lowermost heat exchanger elements may be maintained at about 10° C. and about 40° C., respectively. The secondary heat exchanger means, on the other hand, may comprise a plurality of condensation traps in fluid flow communication with one another. Thus, the gaseous hydrocarbons and condensable hydrocarbon vapors after having passed through the primary heat exchanger means are passed into the condensable traps from one to another. For example, the gaseous hydrocarbons and condensable hydrocarbon vapors may be first passed into a condensation trap maintained at a temperature of about −20° C. and then into the other condensation traps which are maintained at a temperature of about −80° C.

As indicated above, the process according to the invention enables used rubber tires to be converted into high amounts of liquid hydrocarbons. Typically, about 60 weight % liquid hydrocarbons, about 38 weight % solid carbonaceous material and about 2 weight % gaseous hydrocarbons can be produced from used rubber tires by the process of the invention. The liquid hydrocarbons produced in accordance with the invention have a calorific value of about 10,200 kcal kg$^{-1}$ and are thus suitable for use as heating fuel.

BRIEF DESCRIPTION OF THE DRAWINGS

Further features and advantages of the invention will become more readily apparent from the following description of preferred embodiments thereof as illustrated by way of example in the accompanying drawings, in which.

DESCRIPTION OF PREFERRED EMBODIMENTS

Figure 1:
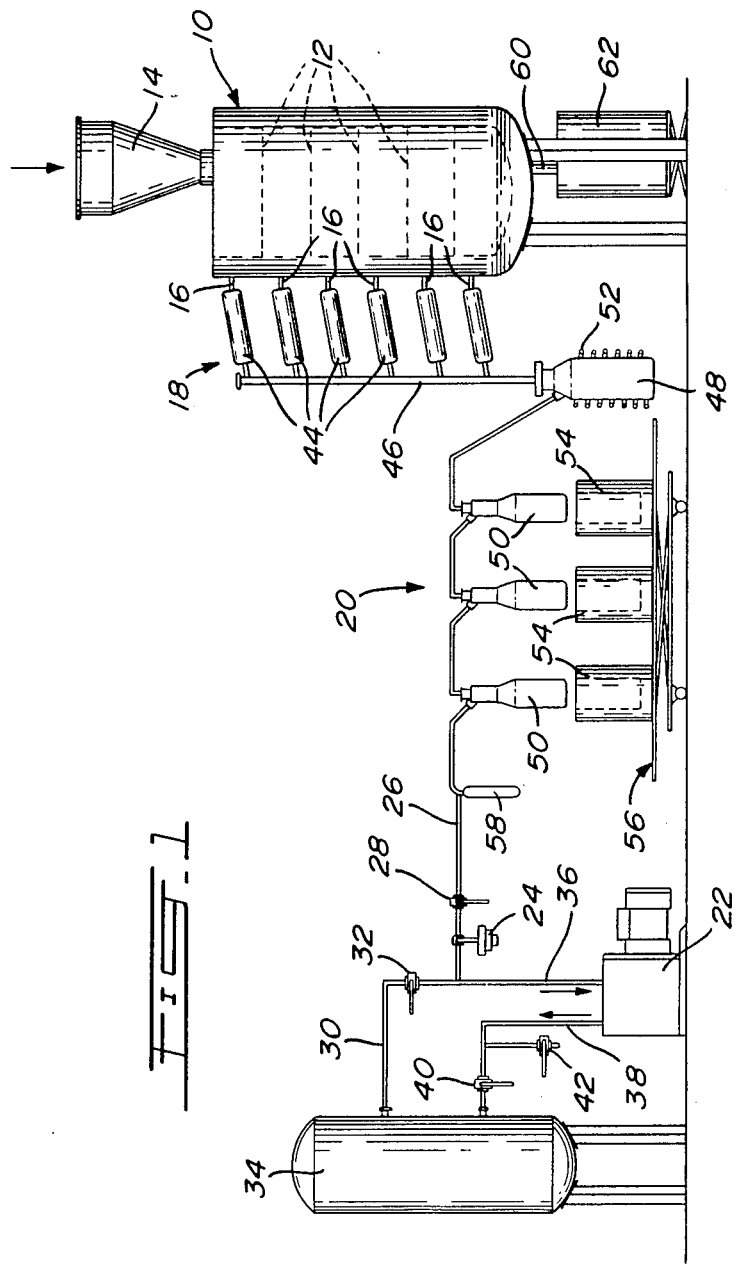
FIG. 1 is schematic illustration of an apparatus for carrying a process according to the invention.

Referring first to FIG. 1, there is illustrated an apparatus for carrying out the vacuum pyrolysis of used rubber tires in the form of cuttings, comprising a multi-tray reactor 10 having a plurality of spaced-apart heated trays 12 arranged above one another and each adapted to receive a bed of tire cuttings charged into the reactor via the hopper 14 and transported from an upper to a lower tray by conventional means (not illustrated), for subjecting the tire cuttings to pyrolysis. The trays 12 are heated at temperatures to provide a vertical temperature gradient between the uppermost and lowermost trays with the lowermost tray being heated at a temperature higher than the uppermost tray. Typically, the uppermost and lowermost trays are heated at about 250° C. and about 500° C., respectively. The heating of the trays 12 and the residence time of the tire cuttings thereon are such that the tire cuttings when reaching the lower portion of the reactor (i.e. the two lowermost trays) are treated at a temperature of about 360° C. to about 415° C. and that the temperature of the tire cuttings does not exceed about 415° C.

The reactor 12 is provided with a plurality of discharge outlets 16 each associated with a respective tray 12 for discharging the gaseous hydrocarbons and condensable hydrocarbon vapors generated in the reactor. The discharge outlets 16 are connected via primary and secondary heat exchangers 18 and 20 to a vacuum pump 22 for maintaining sub-atmospheric pressure in the reactor 12 and causing the gaseous hydrocarbons and condensable hydrocarbon vapors to flow out of the reactor through the discharge outlets. A sub-atmospheric pressure of less than about 35 mm Hg is maintained in the reactor 12 by means of a vacuum control device 24 connected to the vacuum line 26 and adapted to set a predetermined subatmospheric pressure. The vacuum line 26 which is provided with a valve 28 is bifurcated into two lines, a first line 30 provided with a valve 32 and connected to a gas reservoir or tank 34 for storing the gaseous hydrocarbons produced in the reactor 12, and a second line 36 leading to the vacuum pump 22. A further line 38 provided with valves 40 and 42 interconnects the vacuum pump 22 and gas tank 34, the valve 42 being a vent valve.

The primary and secondary heat exchanger 18 and 20 through which the gaseous hydrocarbons and condensable hydrocarbon vapors are passed are adapted to condense the condensable hydrocarbon vapors to thereby obtain the desired liquid hydrocarbons. The primary heat exchanger 18 comprises a plurality of shell and tube heat exchanger elements 44 each connected to a respective discharge outlet 16. The heat exchanger elements 44 are maintained at temperatures to provide a vertical temperature gradient between the uppermost and lowermost heat exchanger elements with the lowermost heat exchanger element being maintained at a temperature higher than the uppermost heat exchanger element. Typically, the uppermost and lowermost heat exchanger elements are maintained at about 10° C. and about 40° C., respectively. About 70% of the total condensable hydrocarbon vapors produced are condensed by means of the primary heat exchanger 18.

The gaseous hydrocarbons and remaining condensable hydrocarbon vapors leaving the heat exchanger elements 44 are collected by means of the collecting conduit 46 and then passed through the secondary heat exchanger 20. The latter comprises a plurality of condensation traps 48,50 in fluid flow communication with one another. The first condenstaion trap 48 is advantageously maintained at a temperature of about −20° C. by means of a refrigerant coil 52 in which an aqueous solution of ethylene glycol is circulated. The other condensation traps 50, on the other hand, are maintained at a temperature of about −80° C. by being immersed in acetone/$CO_2$ baths contained in thermos containers 54 supported on a wheeled vertically displaceable platform 56. A filter 58 comprising glass wool is provided for filtering the gaseous hydrocarbons from which have extracted any condensable hydrocarbon vapors, prior to the gaseous hydrocarbons being sucked via lines 26,36 through the vacuum pump 22 and directed into the gas tank 34 via line 38.

The solid carbonaceous material which is produced in the reactor 12 as a result of the pyrolysis of the tires is discharged via the bottom outlet 60 into a suitable container 62 placed underneath.

At the start of the process, the gas tank 34 is first evacuated by closing the valves 28,40 and opening the valves 32,42 so that any air or other gas contained in the tank 34 is sucked via lines 30,36 through the vacuum pump 22 and vented to the atmosphere via line 38 through the vent valve 42. Once the gas tank 34 has been evacuated, the valves 32,42 are closed and the valves 28,40 are opened so as to establish the necessary vacuum throughout the system and direct the gaseous hydrocarbons produced through the vacuum pump 22 and into the gas tank 34.

Using the apparatus illustrated in FIG. 1 and sampling the pyrolytic products for their composition as a function of temperature provided the following results:

TABLE 1

| Ex. No. | Temperature (°C.) | Yields (weight %) | | |
|---|---|---|---|---|
| | | Oils | Char | Gases |
| 1 | 250 | 8.9 | 91.1 | 0.0 |
| 2 | 310 | 20.2 | 79.5 | 0.3 |

TABLE 1-continued

| Ex. No. | Temperature (°C.) | Yields (weight %) | | |
|---|---|---|---|---|
| | | Oils | Char | Gases |
| 3 | 335 | 29.5 | 68.8 | 1.7 |
| 4 | 363 | 51.5 | 45.6 | 2.9 |
| 5 | 415 | 61.2 | 36.6 | 2.2 |
| 6 | 500 | 60.2 | 35.5 | 4.3 |

Figure 2:
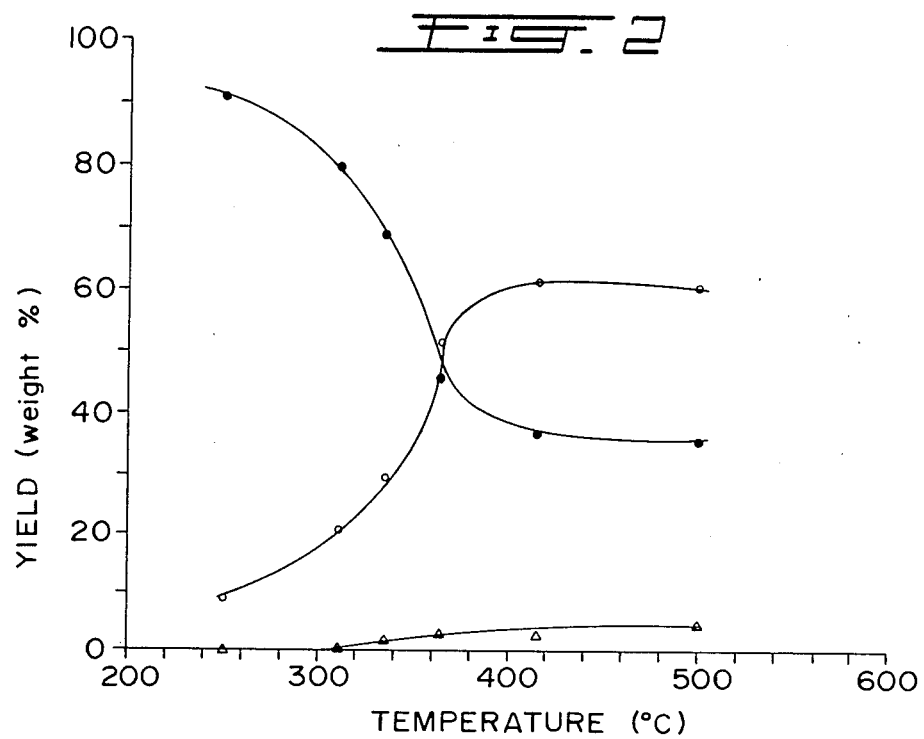
FIG. 2 is a plot of the product yield as a function of temperature.

The above data are reported in FIG. 2, in which the symbols (o), (●) and (Δ) represent the following:
o : liquid hydrocarbons
●: char (solid carbonaceous material)
Δ: gaseous hydrocarbons.

As shown in FIG. 2, when the pyrolysis temperature exceeds about 415° C., the yield of liquid hydrocarbons is lowered. This is due to a gasification of the char or solid carbonaceous material, which produces more gaseous hydrocarbons. As it is apparent, the optimum temperature range for a maximum production of liquid hydrocarbons is about 360°–415° C.

The tire cuttings used in these experiments had the following characteristics:
Elementary Analysis:
C: 85.7%
H: 7.5%
N: 0.3%
O: 5.1%
S: 1.4%
Volatile matter: 65.2%
Fixed Carbon: 28.7%
Ashes: 6.1%
Calorific Value: 8,787 kcal kg$^{-1}$
Size: ¼"–½" Tyler.

The hydrocarbon oils produced from such tire cuttings had the following characteristics:
Elementary Analysis:
C: 87.1%
H: 10.5 %
N: 0.2%
O: 1.4%
S: 0.8%
Calorific Value: 10,200 kcal kg$^{-1}$
Density: 0.95 g ml$^{-1}$
Humidity: 0.15%
Dynamic Viscosity (21° C.): 168 cp
Dynamic Viscosity (49° C.): 46 cp.

Three additional experiments were carried out with a view to illustrating the effect of pressure on the yield of the liquid hydrocarbons. The results obtained are as follows:

TABLE 2

| Ex. No. | Absolute Pressure (mm Hg) | Yields (weight %) | | |
|---|---|---|---|---|
| | | Oils | Char | Gases |
| 7 | 15 | 57.2 | 38.4 | 4.4 |
| 8 | 35 | 56.9 | 37.5 | 5.6 |
| 9 | 50 | 54.5 | 39.8 | 5.7 |

Figure 3:
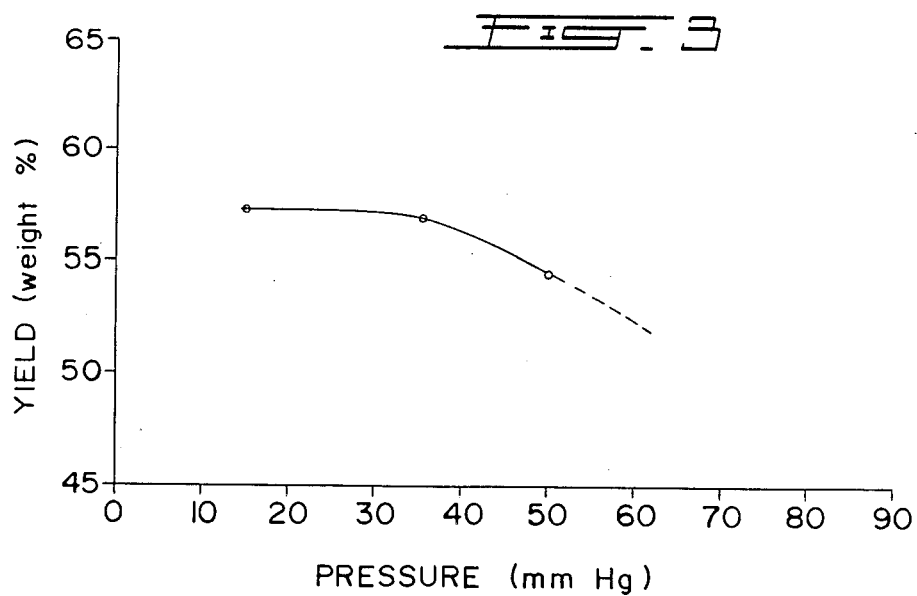
FIG. 3 is a plot of the yield of liquid hydrocarbons as a function of pressure.

The above data for the liquid hydrocarbons only are reported in FIG. 3. As shown, when the sub-atmospheric pressure is greater than about 35 mm Hg, the yield of liquid hydrocarbons is lowered. As it is apparent from Table 2, operating under an absolute pressure above 35 mm Hg promotes the formation of gaseous hydrocarbons to the detriment of the liquid hydrocarbons. The sub-atmospheric pressure must therefore be maintained under about 35 mm Hg to provide a maximum production of liquid hydrocarbons.

I claim:

1. A process for the treatment of used rubber tires by vacuum pyrolysis in a reactor to produce liquid and gaseous hydrocarbons and a solid carbonaceous material,
which comprises the steps of feeding used rubber tire material into the reactor and pyrolysing said rubber tire material at a temperature in the range of about 360° C. to about 415° C., under a subatmospheric pressure of less than about 35 mm Hg and such that gases and vapors produced in said reactor have a residence time of the order of a few seconds, whereby to increase the yield of said liquid hydrocarbons and lower the yields of said gaseous hydrocarbons and said solid carbonaceous material.

2. A process as claimed in claim 1, wherein said temperature is in the range of about 380° C. to about 400° C.

3. A process as claimed in claim 1, wherein said subatmospheric pressure is less than about 30 mm Hg.

4. A process as claimed in claim 1, wherein said residence time is of about 1 second to about 3 seconds.

5. A process as claimed in claim 1, wherein said rubber tire material comprises shredded tire material comprised of tire shreds.

6. A process as claimed in claim 5, wherein said tire shreds have a mesh size of about 5 mm to about 15 mm.

7. A process as claimed in claim 5, wherein said reactor is a multi-tray reactor having a plurality of spaced-apart heated trays arranged above one another and each receiving a bed of said tire shreds with said tire shreds being transported from an upper to a lower tray, and wherein said trays are heated at temperatures to provide a vertical temperature gradient between uppermost and lowermost trays with the lowermost tray being heated at a temperature higher than the uppermost trays, whereby said tire shreds while being transported towards said lowermost tray are gradually heated to said pyrolysis temperature and attain said pyrolysis temperature in a lower portion of said reactor.

8. A process as claimed in claim 7, wherein said uppermost and lowermost trays are heated at about 250° C. and about 500° C., respectively, and wherein the residence time of said tire shreds on the trays of the lower portion of the reactor is controlled such that the temperature of said tire shreds does not exceed about 415° C.

9. A process as claimed in claim 7, wherein said reactor is provided with a plurality of discharge outlets each associated with a respective tray for discharging gaseous hydrocarbons and condensable hydrocarbon vapors generated in said reactor, and wherein said gaseous hydrocarbons and condensable hydrocarbon vapors are withdrawn from said reactor through said discharge outlets and passed through heat exchanger means for condensing said condensable hydrocarbon vapors to thereby obtain said liquid hydrocarbons, said discharge outlets being connected via said heat exchanger means to vacuum means for maintaining said sub-atmospheric pressure in said reactor and causing said gaseous hydrocarbons and condensable hydrocarbon vapors to flow out of said reactor through said discharge outlets.

10. A process as claimed in claim 9, wherein said heat exchanger means include primary and secondary heat exchanger means, said primary heat exchanger means comprising a plurality of heat exchanger elements each connected to a respective discharge outlet, and wherein said heat exchanger elements are maintained at temperatures to provide a vertical temperature gradient between uppermost and lowermost heat exchanger elements with the lowermost heat exchanger element being maintained at a temperature higher than the uppermost heat exchanger element.

11. A process as claimed in claim 10, wherein said uppermost and lowermost heat exchanger elements are maintained at about 10° C. and about 40° C., respectively.

12. A process as claimed in claim 10, wherein said secondary heat exchanger means comprise a plurality of condensation traps in fluid flow communication with one another and wherein said gaseous hydrocarbons and condensable hydrocarbon vapors after having passed through said primary heat exchanger means are passed into said condensation traps from one to another.

13. A process as claimed in claim 12, wherein said gaseous hydrocarbons and condensable hydrocarbon vapors first passed into a condensation trap maintained at a temperature of about $-20°$ C. and then into the other condensation traps, said other condensation trap being maintained at a temperature of about $-80°$ C.

14. A process as claimed in claim 1, wherein said pyrolysis is carried out at said temperature, sub-atmospheric pressure and gas/vapor residence time to produce about 60 weight % liquid hydrocarbons, about 38 weight % solid carbonaceous material and about 2 weight % gaseous hydrocarbons.

15. A process as claimed in claim 1, wherein said pyrolysis is carried out at said temperature, sub-atmospheric pressure and gas/vapor residence time to produce liquid hydrocarbons having a calorific value of about 10,200 kcal $kg-1$.

* * * * *